US010727747B2

(12) United States Patent
Macri

(10) Patent No.: US 10,727,747 B2
(45) Date of Patent: Jul. 28, 2020

(54) HYBRID BUCK-BOOST CONVERTER

(71) Applicant: Dialog Semiconductor (UK) Limited, London (GB)

(72) Inventor: Nicola Macri, Feldkirchen (DE)

(73) Assignee: Dialog Semiconductor (UK) Limited, London (GB)

(*) Notice: Subject to any disclaimer, the term of this patent is extended or adjusted under 35 U.S.C. 154(b) by 0 days.

(21) Appl. No.: 16/373,918

(22) Filed: Apr. 3, 2019

(65) Prior Publication Data
US 2019/0341850 A1    Nov. 7, 2019

(30) Foreign Application Priority Data

May 4, 2018   (DE) .................. 10 2018 206 918

(51) Int. Cl.
*H02M 3/158*   (2006.01)
*H02M 3/156*   (2006.01)

(52) U.S. Cl.
CPC .......... *H02M 3/1582* (2013.01); *H02M 3/156* (2013.01); *H02M 3/158* (2013.01)

(58) Field of Classification Search
CPC ....... H02M 3/155–158; H02M 3/1582; H02M 3/1584; H02M 3/1588; H02M 1/083; Y02B 70/1466
USPC .......... 323/234, 235, 259, 271, 282–285, 31
See application file for complete search history.

(56) References Cited

U.S. PATENT DOCUMENTS 6,348,781 B1 * 2/2002 Midya .................. H03F 1/0227
323/222
8,319,483 B2 * 11/2012 Fishelov ............... H02M 3/157
323/271
8,519,777 B2 * 8/2013 Brown .................... H02M 3/07
327/536
8,669,744 B1 * 3/2014 Vinciarelli .......... H02M 3/1582
323/235
8,860,387 B2 * 10/2014 Kobayashi .......... H02M 3/1582
323/259
10,003,261 B2 * 6/2018 Petersen ............... H02M 3/158
(Continued)

FOREIGN PATENT DOCUMENTS

DE    10 2014 203 159    8/2015
DE      2016 225 795     6/2018

OTHER PUBLICATIONS

German Office Action, File No. 10 2018 206 918.2, Applicant: Dialog Semiconductor (UK) Limited, dated Jan. 8, 2019, 4 pages, and English lanuage translation, 5 pages.
(Continued)

*Primary Examiner* — Yemane Mehari
(74) *Attorney, Agent, or Firm* — Saile Ackerman LLC; Stephen B. Ackerman

(57) ABSTRACT

A power converter and a method to convert between a first voltage at a first node and a second voltage at a second node is presented. The power converter has a flying capacitor, an inductor, a first switch, a second switch, a third switch, a fourth switch, and a fifth switch. Furthermore, the power converter has a control unit to control the first, second, third, fourth and fifth switches in a first sequence of operation phases to provide step-up conversion between the first voltage and the second voltage; and in a second sequence of operation phases to provide step-down conversion between the first voltage and the second voltage.

20 Claims, 6 Drawing Sheets

(56) References Cited

U.S. PATENT DOCUMENTS

| | | | | |
|---|---|---|---|---|
| 10,348,112 | B2* | 7/2019 | Somerville | H02J 7/0052 |
| 2012/0229110 | A1* | 9/2012 | Huang | H02M 3/1582 |
| | | | | 323/282 |
| 2016/0344214 | A1* | 11/2016 | Petersen | H02M 3/158 |
| 2018/0159426 | A1* | 6/2018 | Vinciarelli | H02M 3/1582 |

OTHER PUBLICATIONS

"A Digitally Controlled 94.8%-Peak-Efficiency Hybrid Switched-Capacitor Converter for Bidirectional Balancing and Impedance-Based Diagnostics of Lithium-Ion Battery Arrays," by Christopher Schaef et al., 2017 IEEE International Solid-State Conference, Feb. 5-9, 2017, pp. 180-182.

"A Fully-Integrated 3-Level DC-DC Converter for Nanosecond-Scale DVFS," by Wonyoung Kim et al., IEEE Journal of Solid-State Circuits, vol. 47, No. 1, Jan. 2012, pp. 206-219.

"Flying Capacitor Voltage Balancing Method by Sensing Inductor Current," CPES (Center for Power Electronics Systems) Showcase, Research, Copyright © 2019 Virginia Tech Center for Power Electronics Systems, pp. 1-3.

"Three level buck converter with improved dynamic performance using linear-non linear control," by Reshma, P.S., et al., International Journal of Innovative Research in Electrical, Electronics, Instrumentation and Control Engineering, vol. 2, Issue 3, Mar. 2014. pp. 1189-1192.

"A Hybrid Inductor-Based Flying-Capacitor-Assisted Step-Up/Step-Down DC-DC Converter with 96.56% Efficiency," by Yong-Min Ju et al., 2017 IEEE International Solid-State Circuits Conference, Feb. 5-9, 2017, pp. 184-186.

"Multi-Level conversion: High voltage Choppers and Voltage-Source Inverters," by T.A. Meynard et al., PESC '92 Record. 23rd Annual IEEE Power Electronics Specialists Conference, Jun. 29-Jul. 3, 1992, pp. 397-403.

"Design of a Fully Integrated Three-Level Buck Converter," by Y. Neelima et al., International Journal of Engineering Sciences & Research Technology, [Neelima, 3(8): Aug. 2014] ISSN: 2277-9655, Scientific Journal Impact Factor: 3.449 (ISRA), Impact Factor: 1.852, pp. 701-704.

"Three-Level Buck Converter for Envelope Tracking Applications," by Vahid Yousefzadeh et al., IEEE Transactions on Power Electronics, vol. 21, No. 2, Mar. 2006, pp. 549-552.

"A Fully-Integrated Switched-Capacitor 2:1 Voltage Converter with Regulation Capability and 90% Efficiency at 2.3A/mm$^2$," by Leland Chang et al., 2010 Symposium on VLSI Circuits/Technical Digest of Technical Papers, Jun. 16-18, 2010, pp. 55-56.

* cited by examiner

HYBRID BUCK-BOOST CONVERTER

TECHNICAL FIELD

The present document relates to switched power converters. In particular, the present document relates to a power efficient combined step-up/step-down DCDC power converter.

BACKGROUND

In battery powered applications such as smartphones, there may be the need for providing voltages that are above or below the battery voltage, e.g. depending on the State Of Charge (SOC) of the battery itself. A typical example is the generation of a constant 3.3V rail from a Li-Ion battery pack, wherein the voltage of the battery pack may vary between 2.5V and 4.2V, depending on the SOC of the battery pack. When the battery is fully charged (4.2V), a step-down regulator is required to generate the 3.3V rail (e.g. a buck converter or an LDO), whilst when the battery is discharged (2.5V) a step-up regulator is needed to generate the same 3.3V output rail (e.g. a boost regulator).

In such a scenario, a buck-boost regulator 100 as shown in FIG. 1 may be used. The regulator 100 comprises two buck switches S1 and S2, at the left hand side of the coil 101, and two boost switches S3 and S4, at the right hand side of the coil 101. Hence, the step-up function and the step-down function are implemented using a single coil 101 as an external component (typically in addition to an input capacitor and an output capacitor of the regulator 100).

A drawback of the topology shown in FIG. 1 is the use of two switches S1 and S3, which are arranged in series between the input and the output of the regulator 100, thereby impacting the efficiency of the regulator 100 at relatively high loads and thereby limiting the maximum current that can be delivered to the output of the regulator 100 in a boost or step-up mode.

SUMMARY

The present document addresses the technical problem of providing a power efficient and a BOM (bill of material) efficient power converter which can be operated in a step-up mode and in a step-down mode.

According to an aspect, a power converter configured to convert between a first current at a first voltage provided at a first node of the power converter and a second current at a second voltage provided at a second node of the power converter is described. The first voltage and the second voltage are relative to a reference voltage (e.g. to ground).

The power converter comprises a flying capacitor and an inductor, wherein a second port of the inductor is coupled to the second node. Furthermore, the power converter comprises: a first switch configured to couple or to decouple a first port of the flying capacitor to or from the first node; a second switch configured to couple or to decouple the first port of the flying capacitor to or from a first port of the inductor; a third switch configured to couple or to decouple a second port of the flying capacitor to or from the first port of the inductor; a fourth switch configured to couple or to decouple the second port of the flying capacitor to or from the reference potential; and a fifth switch configured to couple or to decouple the second port of the flying capacitor to or from the second node.

In addition, the power converter comprises a control unit which is configured to control the first, second, third, fourth and fifth switch in a first sequence of operation phases to provide step-up conversion between the first voltage and the second voltage, and in a second sequence of operation phases to provide step-down conversion between the first voltage and the second voltage. Hence, the power converter may be used for step-up conversion and for step-down conversion.

According to another aspect, a method for operating a power converter as outlined in the present document is described. The method may comprise steps which correspond to the features of the power converter described in the present document. In particular, the method may comprise controlling the first, second, third, fourth and fifth switch of the power converter in a first sequence of operation phases to provide step-up conversion between the first voltage and the second voltage of the power converter. Furthermore, the method may comprise controlling the first, second, third, fourth and fifth switch in a second sequence of operation phases to provide step-down conversion between the first voltage and the second voltage.

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the method steps outlined in the present document when carried out on the processor.

According to a further aspect, a computer program product is described. The computer program may comprise executable instructions for performing the method steps outlined in the present document when executed on a computer.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple" or "coupled" refers to elements being in electrical communication with each other, whether directly connected e.g., via wires, or in some other manner.

BRIEF DESCRIPTION OF THE DRAWINGS

The invention is explained below in an exemplary manner with reference to the accompanying drawings, wherein.

DESCRIPTION

As indicated above, the present document addresses the technical problem of providing a power and BOM efficient hybrid buck-boost converter. As indicated in the introductory section, such buck-boost converters may be used in battery powered applications, in order to compensate for voltage changes that are caused by different SOCs of the battery of such battery powered applications.

A further application that requires a buck-boost topology is charging a Li-Ion battery-pack from a standard 5V USB port. Traditionally this is a field of operation for LDOs or buck converters delivering power from the USB input plug to the battery pack itself or to an intermediate system rail, depending on the charging architecture implemented in the device, for instance a portable device such as a smartphone or a tablet. When the nominal 5V USB input is delivered through a high impedance path (e.g. through a long cable connecting the travel adapter to the device USB input port), the actual voltage seen at the input of the charging device is lower than 5V due to the additional voltage drop on the high impedance path, especially in case of relatively high currents. Furthermore, the external regulator that delivers 5V can collapse at relatively high currents, thus further reducing the voltage that is available at the input of the charging device (e.g. below 4.5V). On the other hand, modern battery packs exhibit relatively high End Of Charge (EOC) voltages (e.g. up to 4.5V).

Figure 1:
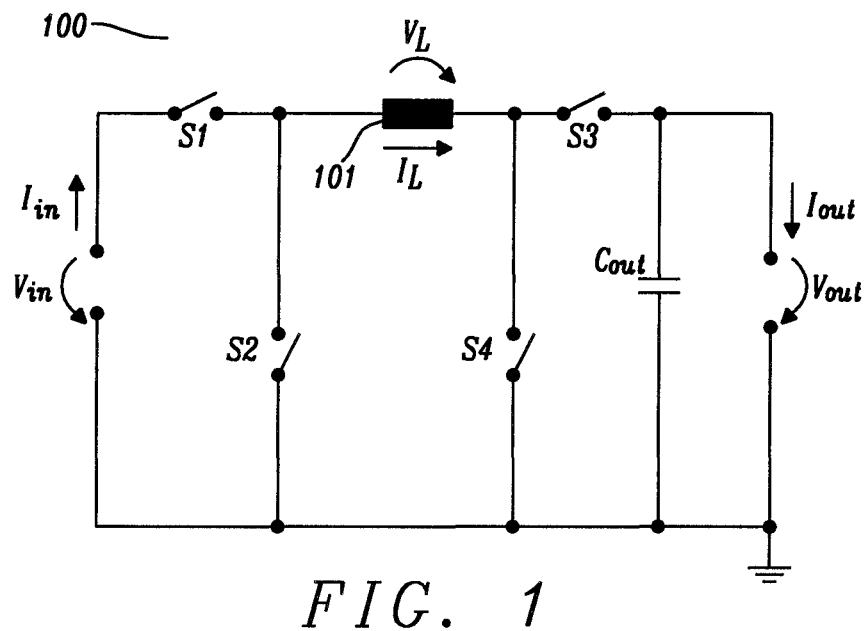
FIGS. 1 and 2 show example buck-boost converter.

The combination of relatively high charge current rates and increased End Of Charge (EOC) voltage may require the use of a buck-boost topology instead of a buck converter, in order to be able to fully charge the battery from a standard USB 5V. For this purpose, a converter 100 as shown in FIG. 1 may be used, which exhibits, however, relatively low power efficiency due to the serial arrangement of switches between the input and the output of the converter 100.

Figure 2:
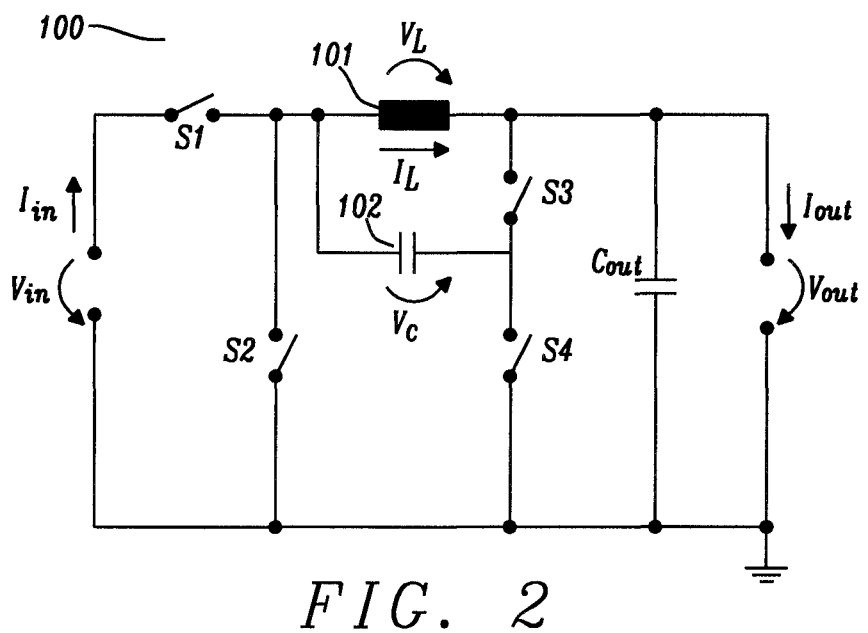

FIG. 2 shows a hybrid topology to overcome the problem of the number of switches between the input and the output of the power converter 100. When the converter 100 shown in FIG. 2 operates in buck mode, switches S1 and S2 toggle, whilst S3 and S4 are not conductive. When the converter 100 operates in boost mode, S3 is on in the magnetization phase, and S1 and S4 are on during the demagnetization phase. Only one switch is conducting between the input and the output, thereby increasing the efficiency of the power converter 100. However, the power converter 100 of FIG. 2 comprises an additional flying capacitor 102, thereby increasing the BOM and the required area of the power converter 100.

Figure 3:
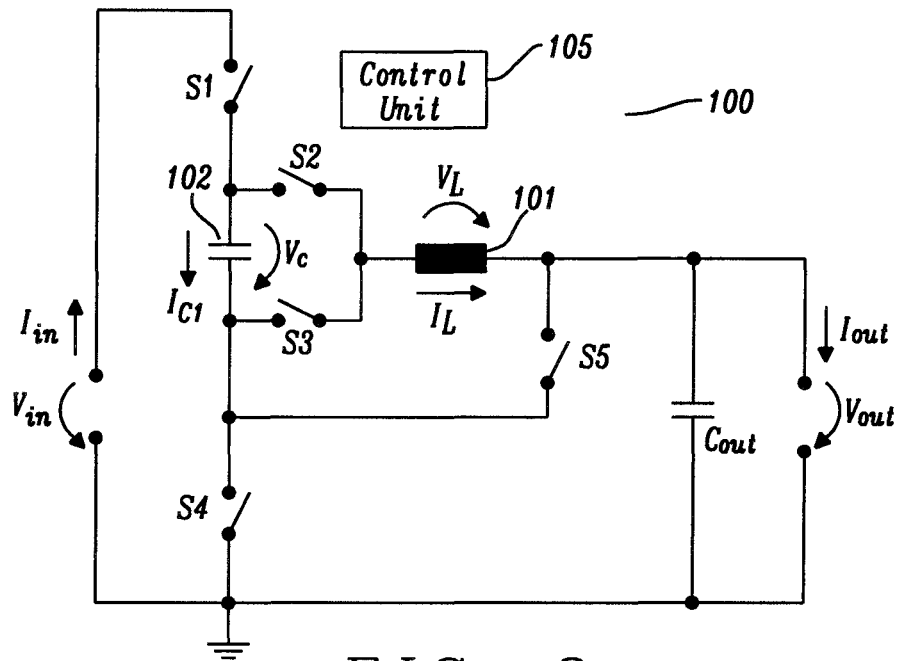
FIG. 3 shows a power and area efficient power converter which may be operated in a step-up mode and in a step-down mode.
Figure 4A:
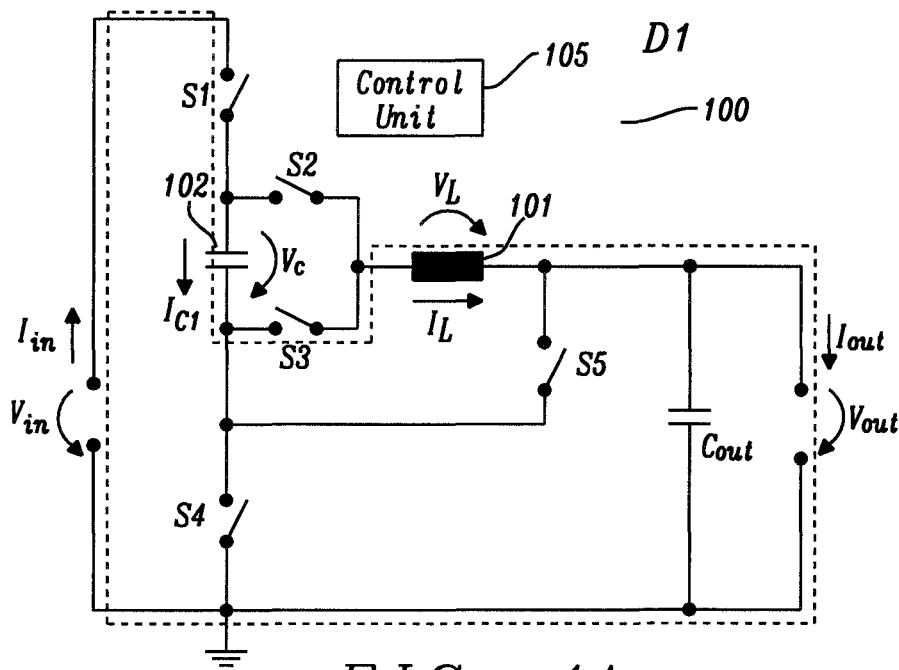
FIGS. 4A to 4D show different operation phases of the power converter of FIG. 3 for step-down conversion.
Figure 4B:
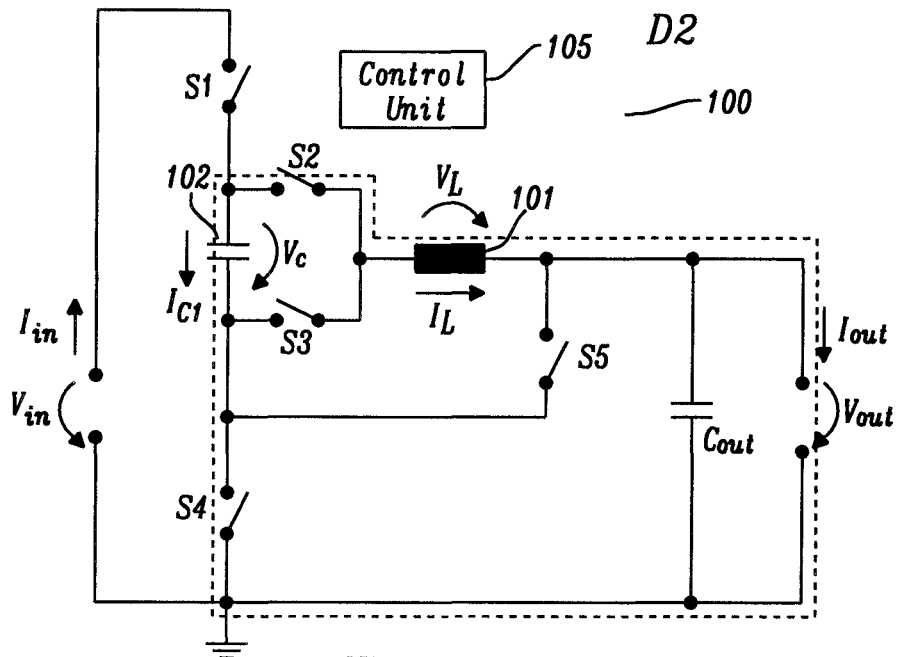
Figure 4C:
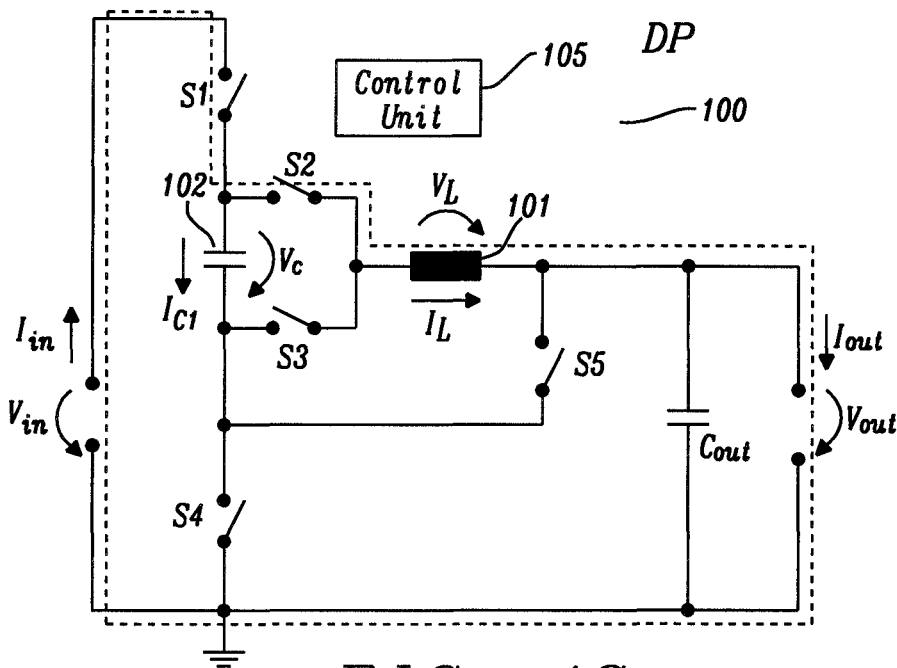
Figure 4D:
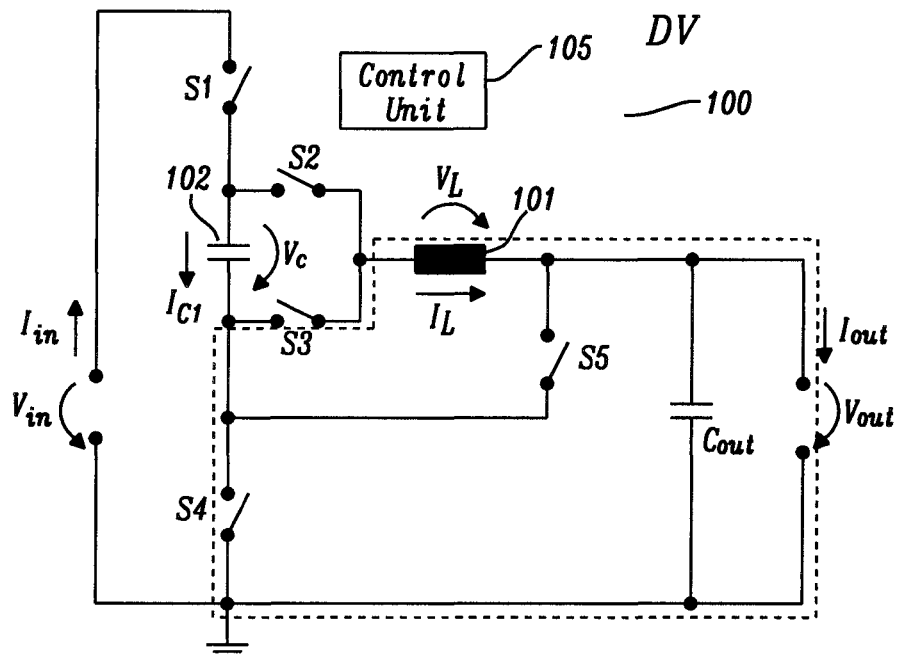

FIG. 3 shows a power converter 100 which is based on a three-level DC-DC converter topology. The power converter 100 comprises a flying capacitor 102 and an inductor 101. In contrast to the topology of FIG. 2, the flying capacitor 102 of FIG. 3 allows the use of an inductor 101 having a reduced size, such that, even though an additional flying capacitor 102 is used, a power converter 100 with a relatively small size can be provided.

The power converter 100 exhibits serial arrangements of two switches between the input and the output of the power converter 100 (e.g. S1 in series with S5 or S1 in series with S3). However, at least switch S3 and switch S5 are not exposed to voltages higher than $V_{in}/2$, which allows the usage of FETs (field effect transistors) with reduced voltage ratings, providing lower on-resistances Rdson at similar parasitic capacitance and reduced reverse recovery loss. Furthermore, the relatively low switching frequency or cycle rate of a multi-level converter improves the efficiency. Hence, a power efficient power converter 100 may be provided.

The power converter 100 of FIG. 3 comprises a (fifth) switch S5 which enables the power converter 100 to not only be operated in a step-down mode, but to also be operated in a step-up mode. Thus, a hybrid buck-boost multi-level converter is provided.

Figure 5A:
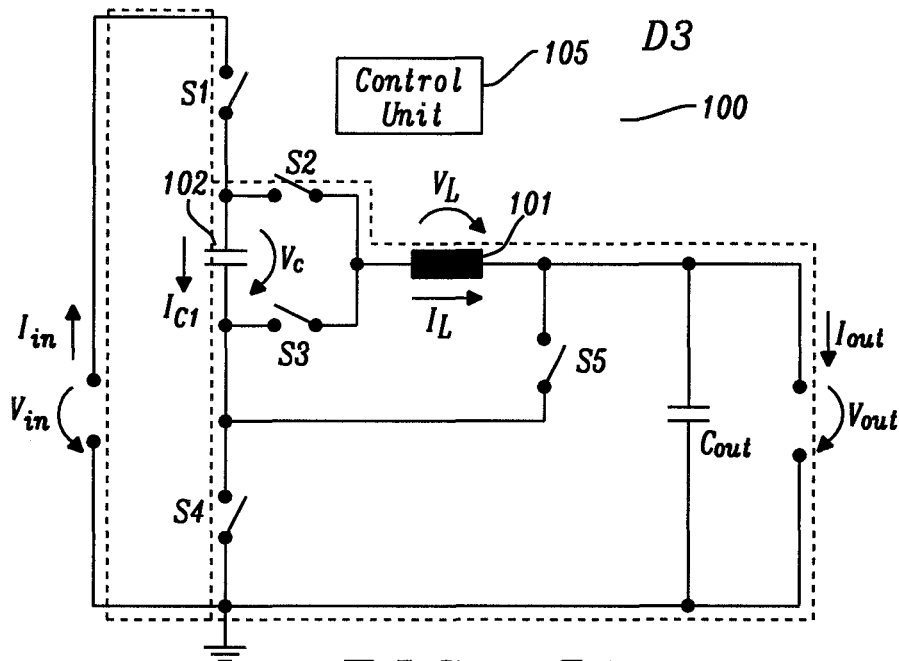
FIGS. 5A to 5B show different operation phases of the power converter of FIG. 3 for step-up conversion.
Figure 5B:
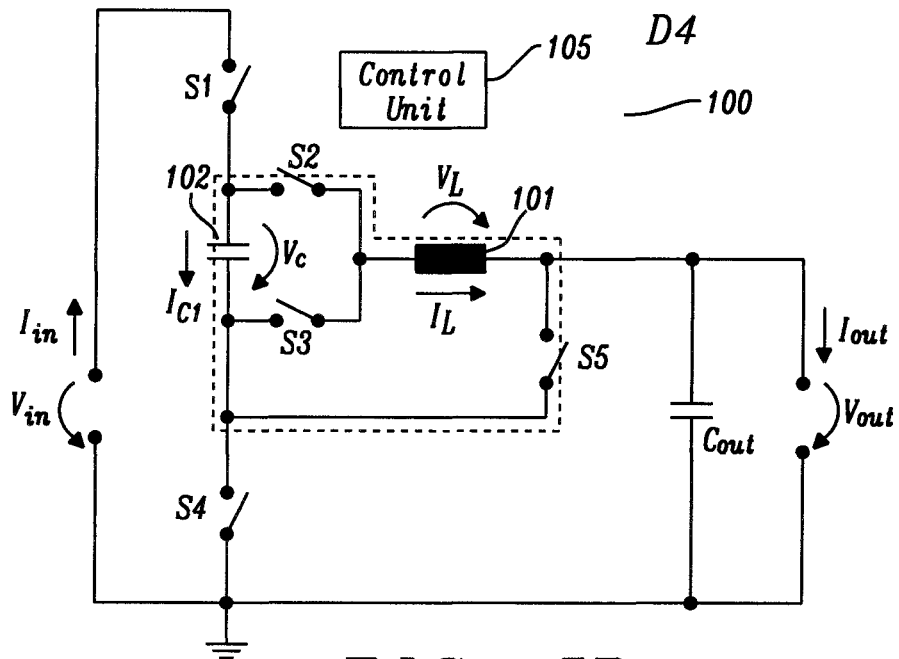

FIGS. 4A to 4D show operations phases that may be used within the step-down mode of the power converter 300, and FIGS. 5A and 5B show operation phases that may be used within the step-up mode. The dotted line within these Figures indicate the current flow during the respective operation phases.

During buck operation, four operation phases according to FIGS. 4A to 4D may be defined to charge and/or discharge the capacitor C 102 and to magnetize and/or demagnetize the coil L 101. The capacitor voltage $V_C$ across the capacitor 102 is typically regulated to $V_{IN}/2$, but other values are possible. During the operation phase D1 (FIG. 4A) the capacitor 102 is charged and the coil 101 is magnetized or demagnetized depending on the values of $V_{IN}$, $V_C$ and/or $V_{OUT}$. This operation phase is referred to herein as charging operation phase. The control unit 105 of the converter 100 may be configured to close (or maintain closed) S1 and S3, and to open (or maintain open) S2, S4 and S5, in order to operate the power converter 100 in the charging operation phase D1.

In operation phase D2 (FIG. 4B) the capacitor 102 is discharged and the coil 101 is magnetized or demagnetized depending on $V_{IN}$, $V_C$ and/or $V_{OUT}$. This operation phase is referred to herein as discharging operation phase. The control unit 105 of the converter 100 may be configured to close (or maintain closed) S2 and S4, and to open (or maintain open) S1, S3 and S5, in order to operate the power converter 100 in the discharging operation phase D2.

In operation phase DP (FIG. 4C) the coil 101 is magnetized and the capacitor voltage $V_C$ does not change. This operation phase is referred to herein as peak operation phase. The control unit 105 of the converter 100 may be configured to close (or maintain closed) S1 and S2, and to open (or maintain open) S3, S4 and S5, in order to operate the power converter 100 in peak operation phase DP.

In operation phase DV (FIG. 4D) the coil 101 is demagnetized and the capacitor voltage $V_C$ does not change. This operation phase is referred to herein as valley operation phase. The control unit 105 of the converter 100 may be configured to close (or maintain closed) S3 and S4, and to open (or maintain open) S1, S2 and S5, in order to operate the power converter 100 in the valley operation phase DV.

For boost operation, two additional phases D3 and D4 are provided, as shown in FIGS. 5A and 5B. In operation phase D3 (FIG. 5A) the capacitor 102 is charged to $V_{IN}$ and the coil 101 is demagnetized because $V_{IN} < V_{OUT}$ (by definition of boost mode operation). This operation phase is referred to herein as demagnetization operation phase. The control unit 105 of the converter 100 may be configured to close (or maintain closed) S1, S2 and S4, and to open (or maintain open) S3 and S5, in order to operate the power converter 100 in magnetization phase D3.

In operation phase D4 (FIG. 5B) the capacitor 102 is connected in parallel to the coil 101 in order to magnetize the coil 101, whilst the capacitor 102 is being discharged. This operation phase is referred to herein as magnetizing operation phase. The control unit 105 of the converter 100 may be configured to close (or maintain closed) S2 and S5, and to open (or maintain open) S1, S3 and S4, in order to operate the power converter 100 in the magnetization operation phase D4.

Figure 7:
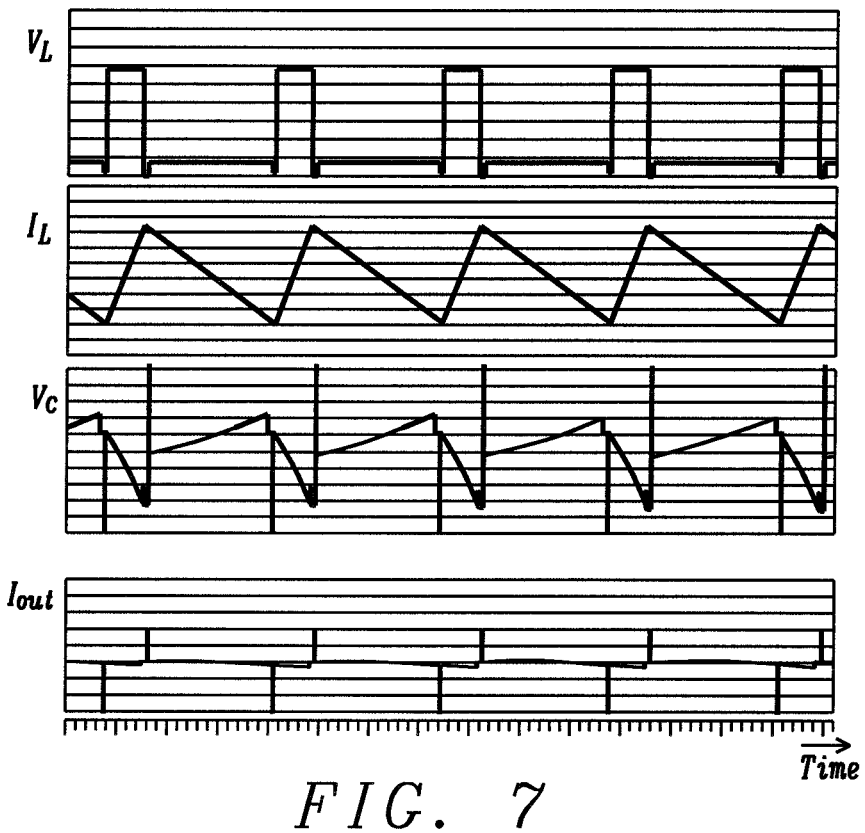
FIG. 7 shows example measurement signals during operation of the power converter of FIG. 3.

FIG. 7 shows measurement signals for an example configuration of converter 100 of FIG. 3 during boost operation. The following parameters are used: $V_{IN}$=4V; $V_{OUT}$=5V; $I_{OUT}$=500 mA; L=220 nH; $C_{OUT}$=100; $C_{FLY}$=20 µF; RDS-ON=10 mΩ (all switches); switching frequency $f_{SW}$=3 MHz. It can be seen from FIG. 7 the voltage over the coil 101 ($V_L$) changes between −1V ($V_{OUT}-V_{IN}$) and 4V ($V_{IN}=V_C$). The switching frequency of 3 MHz allows the use of a relatively small 220 nH coil.

Figure 6:
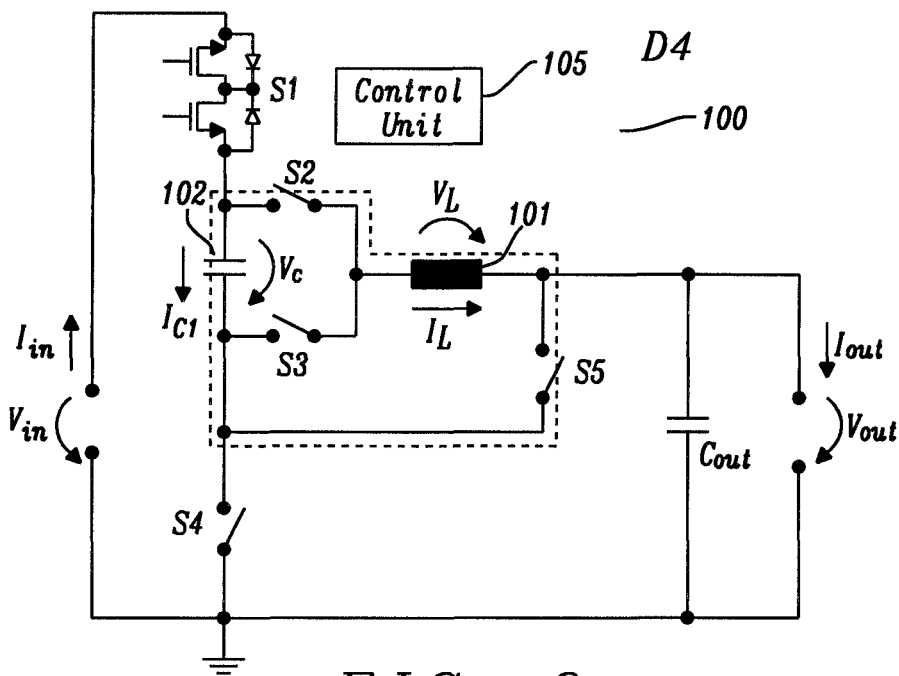
FIG. 6 shows a power converter with a back-to-back switch.

During the D4 operation phase of FIG. 5B (boost mode) the switch S1 is exposed to $V_{IN}$ on the top side and to $V_{OUT}+V_C$ on the bottom side. As $V_{OUT}>V_{IN}$, switch S1 should have a body connection such that the main parasitic bulk diode has the anode at the level of $V_{IN}$. However, during D2 operation phase of FIG. 4B (buck mode) the switch S1 is exposed to $V_{IN}$ on the top side and to $V_C$ on the bottom side. As $V_C<V_{IN}$, switch S1 should have the body connection such that the main parasitic bulk diode has the cathode at the level of $V_{IN}$. If the switch S1 has a bulk connection without technological limitations, then a bulk switch design can connect to the correct terminal (source or drain). If the bulk connection is fixed, the switch S1 may be implemented by placing two transistors back-to-back, as shown in FIG. 6.

The power converter 100 of FIG. 3 may be operated in an intermediate region between buck and boost, where the input voltage $V_{IN}$ and the output voltage $V_{OUT}$ are almost at the same level, thus the power converter 100 may operate either as a buck or as a boost and may change between the buck mode and the boost mode on a cycle-by-cycle basis.

When operating as a buck, the power converter 100 of FIG. 3 may regulate the flying capacitor voltage $V_C$ to $V_{IN}/2$. When operating as a boost, the flying capacitor 100 may be charged up to $V_{IN}$, if the converter 100 is operated as shown in FIGS. 5A and 5B. The different level of the capacitor voltage $V_C$ may be avoided by operating the power converter 100 of FIG. 3 only with the operation phases DV and DP (FIGS. 4C, 4D) in buck mode and with the operation phases D3, D4 (FIGS. 5A, 5B) in boost mode. As a result of this, the flying capacitor 102 is always maintained at $V_C=V_{IN}$, thereby enabling a cycle-by-cycle change between buck mode and boost mode.

Hence, a power converter 100 has been described which enables a reduced solution size and increased conversion efficiency in battery powered applications, while supporting both step-up and step-down options. As a basis, a low frequency switching multi-level buck converter may be used for high-efficient voltage conversion, especially for the case, where the output voltage is in the range of approximately half of the input voltage. A flying capacitor is used for optimizing the efficiency and for minimizing the IC (integrated circuit) area and solution size.

In other words, a power converter 100 is described, which is configured to convert between a first or input current $I_{IN}$ at a first or input voltage $V_{IN}$ provided at a first or input node or the power converter 100 and a second or output current $I_{OUT}$ at a second or output voltage $V_{OUT}$ provided at a second or output node of the power converter 100. The first voltage $V_{IN}$ and the second voltage $V_{OUT}$ are typically relative to a reference voltage (e.g. relative to ground). The power converter 100 may be configured to perform step-down conversion, such that the second voltage is equal to or smaller than the first voltage. Furthermore, the power converter 100 may be configured to perform step-up conversion, such that the second voltage is equal to or higher than the first voltage. The power converter 100 may be configured to flexibly switch between step-up conversion and step-down conversion.

The power converter 100 comprises at least one flying capacitor 102. Furthermore, the power converter 100 comprises an inductor 101. A second port of the inductor 101 may be (directly) coupled to the second (i.e. output) node of the power converter 100. The flying capacitor 102 comprises a first port and a second port, wherein a capacitor voltage across the flying capacitor 102 may be defined as the voltage between the first and the second port of the flying capacitor. Furthermore, the inductor 101 comprises a first port and a second port, wherein a current through the inductor 101 may be defined as the current from the first port to the second port (or vice versa) of the inductor 101.

In addition, the power converter 100 comprises a set of switches, which may be used to arrange the flying capacitor and the inductor in different operation modes or operation phases during the operation of the power converter 100. In particular, the power converter 100 may comprise a first switch S1 which is configured to couple or to decouple the first port of the flying capacitor 102 (directly) to or from the first node of the power converter 100. In addition, the power converter 100 may comprise a second switch S2, which is configured to couple or to decouple the first port of the flying capacitor 102 (directly) to or from the first port of the inductor 101. Furthermore, the power converter 100 may comprise a third switch S3 which is configured to couple or to decouple the second port of the flying capacitor 102 (directly) to or from the first port of the inductor 101. In addition, the power converter 100 may comprise a fourth switch S4 which is configured to couple or to decouple the second port of the flying capacitor 102 (directly) to or from the reference potential.

The power converter 100 further comprises a fifth switch S5 (e.g. with one or more (metalloxide semiconductor) transistors) which is configured to couple or to decouple the second port of the flying capacitor 102 (directly) to or from the second node of the power converter 100. The fifth switch S5 may be used to enable the power converter 100 to perform step-up conversion.

The first, second, third, fourth and fifth switch may be used (notably during steady state operation of the power converter 100) to provide a conversion between electrical power provided at the first node and electrical power provided at the second node of the power converter 100. In particular, the power converter 100 may comprise a control unit 105 (e.g. a microprocessor and/or an analog control circuit) which is configured to control the first, second, third, fourth and fifth switch S1, S2, S3, S4, S5 within a sequence of different operations phases, in order to set the second voltage or the second current (at the second node of the power converter 100) to a target level. For this purpose, the control unit 105 may be configured to repeat the sequence of operation phases during steady state operation at a cycle rate (e.g. at 10 MHz, 5 MHz, 3 MHz or less).

In particular, the control unit 105 may be configured to control the first, second, third, fourth and fifth switch S1, S2, S3, S4, S5 in a first sequence of operation phases to provide step-up conversion between the first voltage $V_{IN}$ and the second voltage $V_{OUT}$ (with $V_{OUT}>V_{IN}$). The first sequence of operation phases typically comprises one or more operation phases during which the fifth switch S5 is closed. In particular, step-up conversion may be provided using alternate opening and closing of the fifth switch S5 in accordance to the duty cycle.

Furthermore, the control unit 105 may be configured to control the first, second, third, fourth and fifth switch S1, S2, S3, S4, S5 in a second sequence of operation phases to provide step-down conversion between the first voltage $V_{IN}$ and the second voltage $V_{OUT}$ (with $V_{OUT}<V_{IN}$). The fifth switch S5 may be maintained open during the second sequence of operation phases. In other words, the fifth switch S5 may not be used (i.e. may be maintained open) for step-down conversion Hence, an area and energy efficient DCDC power converter may be provided, which is configured to flexibly change between step-up conversion and step-down conversion.

The control unit 105 may be configured to determine an indication of the level of the second voltage $V_{OUT}$ and/or an indication of the level of the second current $I_{OUT}$, e.g. at a load which is supplied by the power converter 100. Furthermore, the control unit 105 may be configured to adapt the duty cycle of at least one operation phase from the first and/or second sequence of operation phases, in dependence of the indication of the level of the second voltage $V_{OUT}$ and/or in dependence of the indication of the level of the second current $I_{OUT}$. Hence, a regulated second voltage $V_{OUT}$ may be provided.

As indicated above, the first, second, third, fourth and fifth switches S1, S2, S3, S4, S5 may each comprise or may each be implemented using a field effect transistor. In particular, the first switch S1 may comprises (at least) two field effect transistors which are arranged back-to-back. By doing this, reliable step-up and step-down conversion may be provided using a single power converter.

The first, second, third, fourth and fifth switch S1, S2, S3, S4, S5 may be operated in a PWM mode, i.e. the switches may be either fully closed or fully open. By doing this, the power converter 100 may be operated in a power efficient manner. Alternatively or in addition, the first, second, third, fourth and fifth switch S1, S2, S3, S4, S5 may be operated at least partially in a linear mode.

The first sequence of operation phases may comprise a demagnetization operation phase (as shown e.g. in FIG. 5A), during which the inductor 101 is demagnetized. At the same time, the flying capacitor 102 may be charged. In particular, during the demagnetization operation phase the first switch S1 may be (fully) closed, the second switch S2 may be (fully) closed, the third switch S3 may be (fully) open, the fourth switch S4 may be (fully) closed and the fifth switch S5 may be (fully) open.

Furthermore, the first sequence of operation phases may comprise a magnetization operation phase (as shown e.g. in FIG. 5B), during which the inductor 101 is magnetized using current provided by the flying capacitor 102. During the magnetization operation phase the first switch S1 may be (fully) open, the second switch S2 may be (fully) closed, the third switch S3 may be (fully) open, the fourth switch S4 may be (fully) open and the fifth switch S5 may be (fully) closed.

The control unit 105 may be configured to adapt the duty cycle of the magnetization and/or demagnetization operation phases in order to regulate the second voltage $V_{OUT}$ or the second current $I_{OUT}$ to a target level. In this case, the target level of the second voltage $V_{OUT}$ is typically higher than the actual level of the first voltage V.

The second sequence of operation phases may comprise a charging operation phase (as shown e.g. in FIG. 4A), during which the first switch S1 is (fully) closed, the second switch S2 is (fully) open, the third switch S3 is (fully) closed and the fourth switch S4 is (fully) open. Furthermore, the second sequence of operation phases may comprise a discharging operation phase (as shown e.g. in FIG. 4B), during which the first switch S1 is (fully) open, the second switch S2 is (fully) closed, the third switch S3 is (fully) open and the fourth switch S4 is (fully) closed. The control unit 105 may be configured to adapt the duty cycle of the charging and/or discharging operation phases in order to regulate the capacitor voltage across the flying capacitor 102 to a target level (referred to herein as the capacitor target level).

Alternatively or in addition, the second sequence of operation phases may comprise a peak operation phase (e.g. shown in FIG. 4C), during which the first switch S1 is (fully) closed, the second switch S2 is (fully) closed, the third switch S3 is (fully) open and the fourth switch S4 is (fully) open. Furthermore, the second sequence of operation phases may comprise a valley operation phase (e.g. shown in FIG. 4D), during which the first switch S1 is (fully) open, the second switch S2 is (fully) open, the third switch S3 is (fully) closed and the fourth switch S4 is (fully) closed. The control unit 105 may be configured to adapt the duty cycle of the peak and/or valley operation phases in order to regulate the second voltage $V_{OUT}$ or the second current $I_{OUT}$ to the target level.

Hence, the power converter 100 may be configured to convert electrical power between an input (i.e. first) node and an output (i.e. second) node in a power efficient manner (both, using step-up or step-down conversion).

The control unit 105 may be configured to determine that the target level of the second voltage $V_{OUT}$ is close, notably by 20%, 10% or less deviation, to the actual level of the first voltage V. In other words, it may be determined that a conversion factor of substantially one is to be provided by the power converter 100. In such a case, the control unit 105 may be configured to control the first, second, third, fourth and fifth switch S1, S2, S3, S4, S5 alternately, notably on a cycle-by-cycle basis, in the first sequence of operation phases and in the second sequence of operation phases. In other words, the control unit 105 may be configured to switch back and forth between step-up conversion and step-down conversion (e.g. on a cycle-by-cycle basis). By doing this, a conversion factor close to one may be provided in a reliable manner.

The control unit 105 may be configured to control the first, second, third, fourth and fifth switch S1, S2, S3, S4, S5 such that the capacitor target level for the capacitor voltage $V_C$ across the flying capacitor 102 is substantially equal during the first sequence of operation phases and during the second sequence of operation phases. In particular, the capacitor target level may be set to be equal to the actual level of the first voltage $V_{IN}$. By ensuring that the flying capacitor 102 is charged equally during the first sequence of operation phases and during the second sequence of operation phases, a reliable toggling between step-up conversion and step-down conversion may be provided.

The control unit 105 may be configured, in preparation to a swap from step-up to step-down conversion or vice versa, to align the capacitor voltage $V_C$ across the flying capacitor 102, which is used during the first sequence of operation phases, with the capacitor voltage $V_C$, which is used during the second sequence of operation phases. By doing this, a reliable change between operation modes (step-up conversion or step-down conversion) may be provided.

The control unit 105 may be configured to use only the peak operation phase and the valley operation phase during the second sequence of operation phases (notably prior to or subsequent to a change towards or from the first sequence of operation phases). By doing this, a reliable change between operation modes (step-up conversion or step-down conversion) may be provided.

Figure 8:
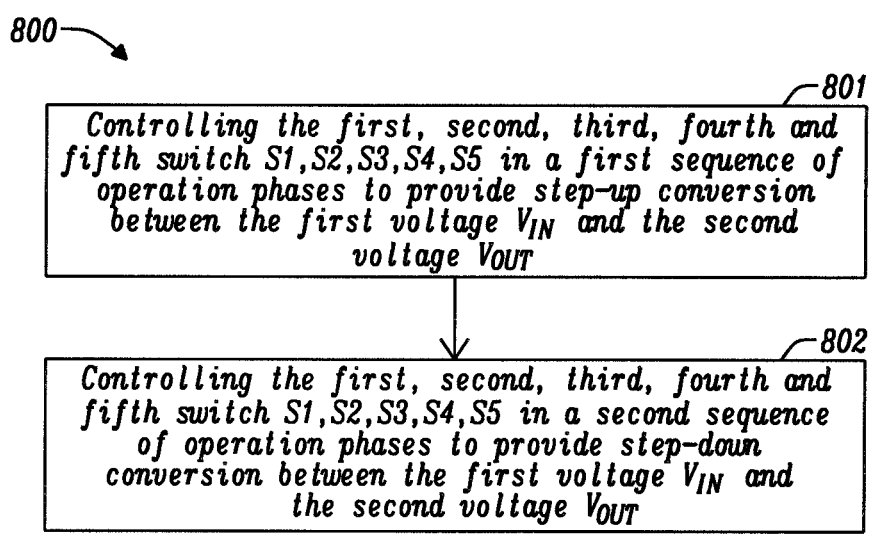
FIG. 8 shows a flow chart of an example method for operating a power converter.

FIG. 8 shows a flow chart of an example method 800 for operating a power converter 100 which is configured to convert between a first voltage $V_{IN}$ at a first node and a second voltage $V_{OUT}$ at a second node. As outlined above, the power converter 100 comprises: a flying capacitor 102; an inductor 101, wherein a second port of the inductor 101 is coupled to the second node; a first switch S1 configured to couple or to decouple a first port of the flying capacitor 102 to or from the first node; a second switch S2 configured to couple or to decouple the first port of the flying capacitor 102 to or from a first port of the inductor 101; a third switch S3 configured to couple or to decouple a second port of the flying capacitor 102 to or from the first port of the inductor 101; a fourth switch S4 configured to couple or to decouple the second port of the flying capacitor 102 to or from the reference potential; and a fifth switch S5 configured to couple or to decouple the second port of the flying capacitor 102 to or from the second node.

The method 800 comprises controlling 801 the first, second, third, fourth and fifth switch S1, S2, S3, S4, S5 in a first sequence of operation phases to provide step-up conversion between the first voltage $V_{IN}$ and the second voltage $V_{OUT}$. Furthermore, the method 800 comprises controlling 802 the first, second, third, fourth and fifth switch S1, S2, S3, S4, S5 in a second sequence of operation phases to provide step-down conversion between the first voltage $V_{IN}$ and the second voltage $V_{OUT}$.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A power converter configured to convert between a first current at a first voltage provided at a first node and a second current at a second voltage provided at a second node; wherein the first voltage and the second voltage are relative to a reference voltage; wherein the power converter comprises
    a flying capacitor;
    an inductor; wherein a second port of the inductor is coupled to the second node;
    a first switch configured to couple or to decouple a first port of the flying capacitor to or from the first node;
    a second switch configured to couple or to decouple the first port of the flying capacitor to or from a first port of the inductor;
    a third switch configured to couple or to decouple a second port of the flying capacitor to or from the first port of the inductor;
    a fourth switch configured to couple or to decouple the second port of the flying capacitor to or from the reference potential;
    a fifth switch directly connected between the second port of the flying capacitor and the second node and configured to couple or to decouple the second port of the flying capacitor to or from the second node; and
    a control unit configured to control the first, second, third, fourth and fifth switch
        in a first sequence of operation phases to provide step-up conversion between the first voltage and the second voltage; and
        in a second sequence of operation phases to provide step-down conversion between the first voltage and the second voltage,
    wherein the first sequence of operation phases comprises
        a magnetization operation phase, during which the inductor is magnetized using current from the capacitor; and
        a demagnetization operation phase, during which the inductor is demagnetized, and
    wherein
        during the demagnetization operation phase the first switch is closed, the second switch is closed, the third switch is open, the fourth switch is closed and the fifth switch is open; and/or
        during the magnetization operation phase the first switch is open, the second switch is closed, the third switch is open, the fourth switch is open and the fifth switch is closed.

2. The power converter of claim 1, wherein
    first sequence of operation phases comprises one or more operation phases during which the fifth switch is closed; and/or
    step-up conversion is provided using alternate opening and closing of the fifth switch in accordance to a duty cycle; and/or
    the fifth switch is maintained open during the second sequence of operation phases.

3. The power converter of claim 1, wherein the second sequence of operation phases comprises
    a charging operation phase, during which the first switch is closed, the second switch is open, the third switch is closed and the fourth switch is open; and
    a discharging operation phase, during which the first switch is open, the second switch is closed, the third switch is open and the fourth switch is closed.

4. The power converter of claim 3, wherein the control unit is configured to adapt a duty cycle of the charging and/or discharging operation phases in order to regulate a capacitor voltage across the flying capacitor to a capacitor target level.

5. The power converter of claim 1, wherein the second sequence of operation phases comprises
    a peak operation phase, during which the first switch is closed, the second switch is closed, the third switch is open and the fourth switch is open; and/or
    a valley operation phase, during which the first switch is open, the second switch is open, the third switch is closed and the fourth switch is closed.

6. The power converter of claim 5, wherein the control unit is configured to adapt a duty cycle of the peak and/or valley operation phases in order to regulate the second voltage or the second current to the target level.

7. The power converter of claim 1, wherein the control unit is configured to
    determine that a target level of the second voltage is close, notably by 20%, 10% or less deviation, to an actual level of the first voltage;
    control the first, second, third, fourth and fifth switch alternately, notably on a cycle-by-cycle basis, in the first sequence of operation phases and in the second sequence of operation phases.

8. The power converter of claim 7, wherein the control unit is configured to control the first, second, third, fourth and fifth switch
such that a capacitor target level for a capacitor voltage across the flying capacitor is substantially equal during the first sequence of operation phases and during the second sequence of operation phases; and
notably such that the capacitor target level is equal to an actual level of the first voltage.

9. The power converter of claim 7, wherein the second sequence of operation phases only comprises the peak operation phase and the valley operation phase.

10. The power converter of claim 1, wherein
the control unit is configured to repeat the first and/or second sequence of operation phases at a cycle rate; and
the cycle rate is 10 MHz, 5 MHz, 3 MHz or smaller.

11. The power converter of claim 1, wherein the control unit is configured to
determine an indication of a level of the second voltage at a load which is supplied by the power converter; and
adapt a duty cycle of at least one operation phase from the first and/or second sequence of operation phases in dependence of the indication of the level of the second voltage.

12. The power converter of claim 1, wherein
the first, second, third, fourth and fifth switches each comprise a field effect transistor; and/or
the first switch comprises two field effect transistors which are arranged back-to-back.

13. A power converter configured to convert between a first current at a first voltage provided at a first node and a second current at a second voltage provided at a second node; wherein the first voltage and the second voltage are relative to a reference voltage; wherein the power converter comprises
a flying capacitor;
an inductor; wherein a second port of the inductor is coupled to the second node;
a first switch configured to couple or to decouple a first port of the flying capacitor to or from the first node;
a second switch configured to couple or to decouple the first port of the flying capacitor to or from a first port of the inductor;
a third switch configured to couple or to decouple a second port of the flying capacitor to or from the first port of the inductor;
a fourth switch configured to couple or to decouple the second port of the flying capacitor to or from the reference potential;
a fifth switch directly connected between the second port of the flying capacitor and the second node and configured to couple or to decouple the second port of the flying capacitor to or from the second node; and
a control unit configured to control the first, second, third, fourth and fifth switch
in a first sequence of operation phases to provide step-up conversion between the first voltage and the second voltage; and
in a second sequence of operation phases to provide step-down conversion between the first voltage and the second voltage,
wherein the first sequence of operation phases comprises
a magnetization operation phase, during which the inductor is magnetized using current from the capacitor; and
a demagnetization operation phase, during which the inductor is demagnetized, and
wherein the control unit is configured to adapt a duty cycle of the magnetization and/or demagnetization operation phases in order to regulate the second voltage or the second current to a target level.

14. The power converter of claim 13, wherein
first sequence of operation phases comprises one or more operation phases during which the fifth switch is closed; and/or
step-up conversion is provided using alternate opening and closing of the fifth switch in accordance to a duty cycle; and/or
the fifth switch is maintained open during the second sequence of operation phases.

15. The power converter of claim 13, wherein the second sequence of operation phases comprises
a charging operation phase, during which the first switch is closed, the second switch is open, the third switch is closed and the fourth switch is open; and
a discharging operation phase, during which the first switch is open, the second switch is closed, the third switch is open and the fourth switch is closed.

16. The power converter of claim 13, wherein the second sequence of operation phases comprises
a peak operation phase, during which the first switch is closed, the second switch is closed, the third switch is open and the fourth switch is open; and/or
a valley operation phase, during which the first switch is open, the second switch is open, the third switch is closed and the fourth switch is closed.

17. The power converter of claim 13, wherein the control unit is configured to
determine that a target level of the second voltage is close, notably by 20%, 10% or less deviation, to an actual level of the first voltage;
control the first, second, third, fourth and fifth switch alternately, notably on a cycle-by-cycle basis, in the first sequence of operation phases and in the second sequence of operation phases.

18. The power converter of claim 13, wherein
the control unit is configured to repeat the first and/or second sequence of operation phases at a cycle rate; and
the cycle rate is 10 MHz, 5 MHz, 3 MHz or smaller.

19. The power converter of claim 13, wherein the control unit is configured to
determine an indication of a level of the second voltage at a load which is supplied by the power converter; and
adapt a duty cycle of at least one operation phase from the first and/or second sequence of operation phases in dependence of the indication of the level of the second voltage.

20. A method for operating a power converter which converts between a first voltage at a first node and a second voltage at a second node; wherein the first voltage and the second voltage are relative to a reference voltage; wherein the power converter comprises: a flying capacitor; an inductor, wherein a second port of the inductor is coupled to the second node; a first switch to couple or to decouple a first port of the flying capacitor to or from the first node; a second switch to couple or to decouple the first port of the flying capacitor to or from a first port of the inductor; a third switch to couple or to decouple a second port of the flying capacitor to or from the first port of the inductor; a fourth switch to couple or to decouple the second port of the flying capacitor to or from the reference potential; and a fifth switch directly connected between the second port of the flying capacitor and the second node and to couple or to decouple the second port of the flying capacitor to or from the second node;
wherein the method comprises,
  controlling the first, second, third, fourth and fifth switch in a first sequence of operation phases to provide step-up conversion between the first voltage and the second voltage; and
  controlling the first, second, third, fourth and fifth switch in a second sequence of operation phases to provide step-down conversion between the first voltage and the second voltage,
wherein the first sequence of operation phases comprises
  a magnetization operation phase, during which the inductor is magnetized using current from the capacitor; and
  a demagnetization operation phase, during which the inductor is demagnetized, and
wherein
  during the demagnetization operation phase the first switch is closed, the second switch is closed, the third switch is open, the fourth switch is closed and the fifth switch is open; and/or
  during the magnetization operation phase the first switch is open, the second switch is closed, the third switch is open, the fourth switch is open and the fifth switch is closed.

* * * * *